United States Patent
Oki

(10) Patent No.: US 6,751,356 B2
(45) Date of Patent: Jun. 15, 2004

(54) IMAGE PROCESSING APPARATUS AND METHOD

(75) Inventor: Joji Oki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 538 days.

(21) Appl. No.: 09/776,917

(22) Filed: Feb. 6, 2001

(65) Prior Publication Data

US 2001/0016077 A1 Aug. 23, 2001

(30) Foreign Application Priority Data

Feb. 7, 2000 (JP) ........................................ 2000-029489

(51) Int. Cl.[7] ................................................. G06K 9/36
(52) U.S. Cl. ........................ 382/240; 382/232; 382/190
(58) Field of Search ................................ 382/232, 240, 382/190, 104, 156; 358/588; 340/933

(56) References Cited

U.S. PATENT DOCUMENTS 6,094,151 A  * 7/2000 Schwartz et al. .......... 341/107
6,625,315 B2 * 9/2003 Laumeyer et al. .......... 382/190

FOREIGN PATENT DOCUMENTS

| JP | 2001-231041 | * 2/2000 | ............ H04N/7/30 |
| JP | 2001-285642 | * 10/2001 | ............ H04N/1/41 |

* cited by examiner

*Primary Examiner*—Anh Hong Do
(74) *Attorney, Agent, or Firm*—Fitzpatrick, Cella, Harper & Scinto

(57) ABSTRACT

Compressed data having as rendering commands region designation data that designates a region of an image, and a parameter for designating image quality of that region is input, and the input compressed data is expanded by an expansion module. A first rendering module develops first bitmap data based on the input rendering commands, and stores it in a BM1 memory. A second rendering module generates attribute information corresponding to respective pixels of the first bitmap data on the basis of attribute information of intermediate data. A conversion module can switch the conversion process by switching parameters in accordance with the attribute information upon converting the first bitmap data into second bitmap data.

7 Claims, 16 Drawing Sheets

FIG. 3A
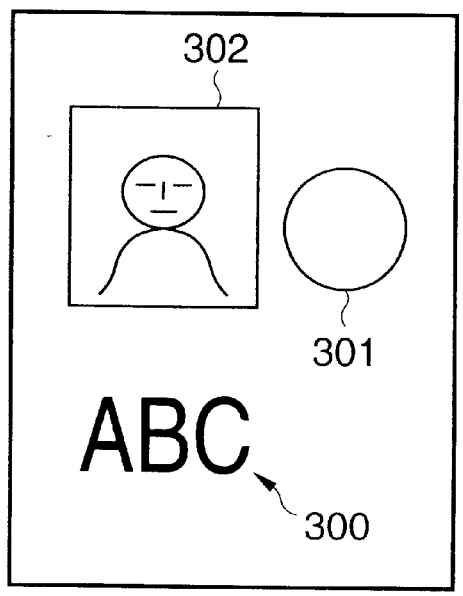
FIG. 3B
object 1
  type=char
  x,y fontname size code=a,color
  x,y fontname size code=b,color
  x,y fontname size code=c,color
object 2
  type=graphic
  x,y r circle,color
object 3
  type=image
  x,y,w,h, image pointer
FIG. 3C
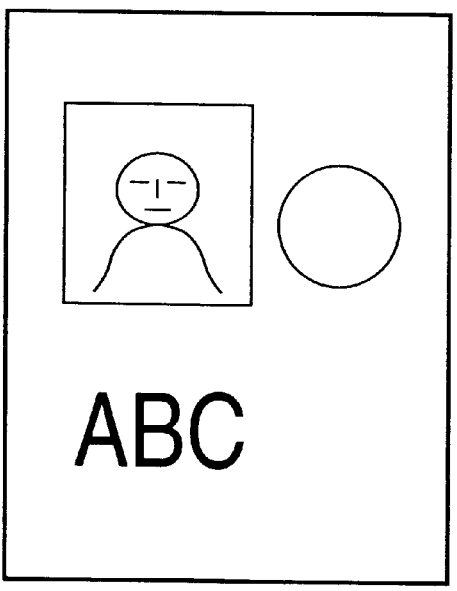
FIG. 3D
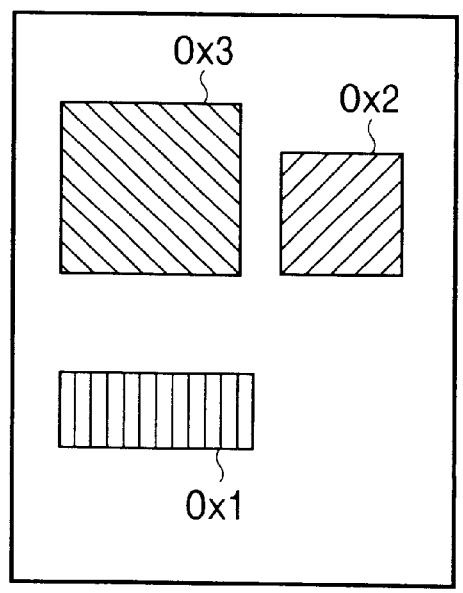

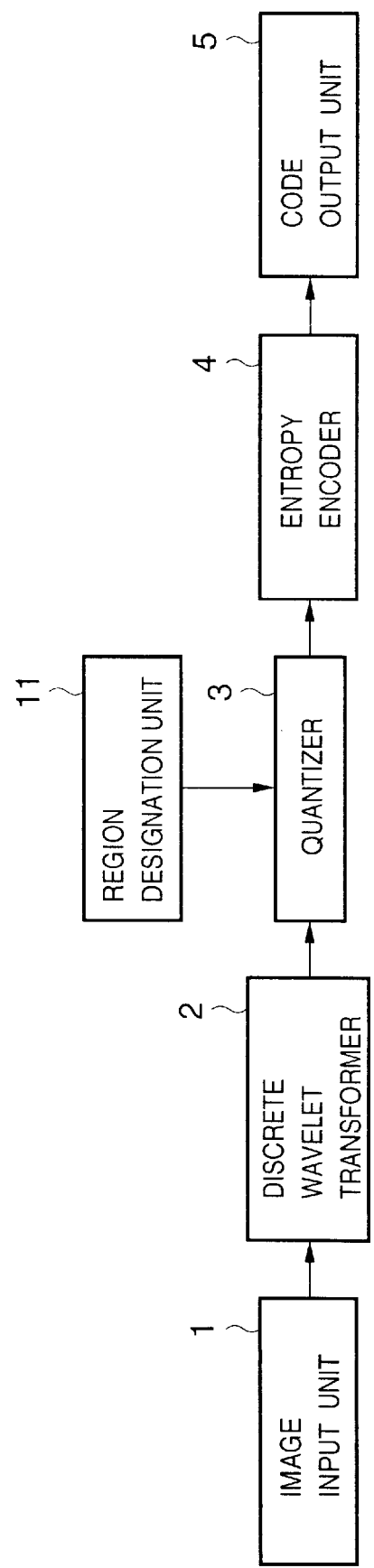

HIGH IMAGE
QUALITY
REGION

NON-HIGH IMAGE QUALITY REGION HIGH IMAGE QUALITY REGION NON-HIGH IMAGE QUALITY REGION

B BITS

FIG. 8A

| MH | TH0 | BS0 | TH1 | BS1 | ··· | THn-1 | BSn-1 |

FIG. 8B

| IMAGE SIZE | TILE SIZE | NUMBER OF COMPONENTS | COMPONENT INFORMATION |

FIG. 8C

| TILE LENGTH | ENCODING PARAMETER | MASK INFORMATION | BIT SHIFT AMOUNT |

FIG. 8D

| LL | HL2 | LH2 | HH2 | HL1 | LH1 | HH1 |

| BIT PLANE S-1 | BIT PLANE S-2 | ··· | BIT PLANE 0 |

FIG. 9A

| MH | TH0 | BS0 | TH1 | BS1 | ... | THn-1 | BSn-1 |

FIG. 9B

| IMAGE SIZE | TILE SIZE | NUMBER OF COMPONENTS | COMPONENT INFORMATION |

FIG. 9C

| TILE LENGTH | ENCODING PARAMETER | MASK INFORMATION | BIT SHIFT AMOUNT |

FIG. 9D

BIT PLANE S-1: | LL | HL2 | LH2 |
BIT PLANE S-2: | LL | ... |
BIT PLANE 0: | LL | HL2 | LH2 | HH2 | HL1 | LH1 | HH1 |

F I G. 12A
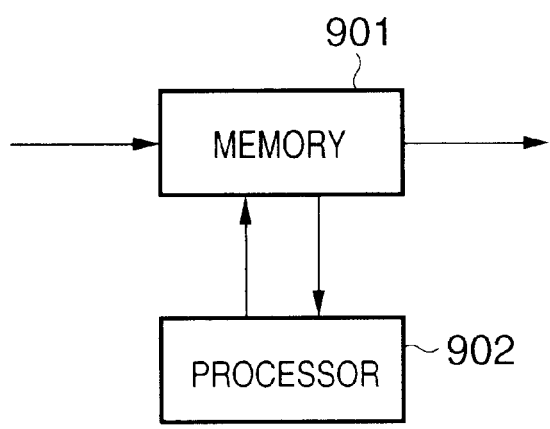
F I G. 12B
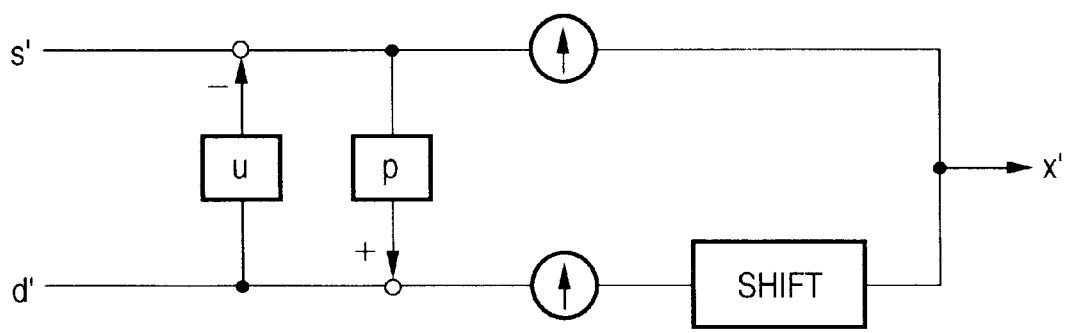

IMAGE PROCESSING APPARATUS AND METHOD

FIELD OF THE INVENTION

The present invention relates to an image processing apparatus and method for receiving compressed data and expanding the compressed data to develop image data.

BACKGROUND OF THE INVENTION

An apparatus, which develops a rendering command (compressed data) input from a host computer or the like into bitmap data, determines attribute information corresponding to each pixel of the bitmap data using the input rendering command and its attribute information, and displays or prints an image obtained from the bitmap data, is known.

In such conventional apparatus, since sole attribute information is appended to the input compressed data, an attribute other than that attribute information cannot be designated for each pixel of image data after the compressed data has been expanded.

In recent years, a compression scheme that uses wavelet transformation has received a lot of attention.

SUMMARY OF THE INVENTION

The present invention has been made in consideration of the above prior art, and has as its object to provide an image processing apparatus and method, which receive as a rendering command obtained by compressing image data using wavelet transformation, and can efficiently process developed image data, when the rendering command is developed to image data and an image represented by the image data includes a plurality of attributes.

In order to attain the above described object, an image processing apparatus of the present invention comprises: input means for inputting compressed data, the compressed data including a data stream obtained by computing a wavelet transform of an image to obtain transform coefficients, shifting up bits of transform coefficients corresponding to a region of interest of the image, and entropy-encoding the shifted-up bits and bits of transform coefficients corresponding to a remaining region; generation means for generating first bitmap data by expanding the compressed data; interpretation means for interpreting the compressed data to discriminate a portion of the region of interest and a remaining portion in the first bitmap data; and conversion means for executing image processes of the portion of the region of interest and the remaining portion using different parameters on the basis of a discrimination result of the interpretation means to convert the portions into second bitmap data.

In order to attain the above described object, an image processing method of the present invention comprises the steps of: inputting compressed data, the compressed data including a data stream obtained by computing a wavelet transform of an image to obtain transform coefficients, shifting up bits of transform coefficients corresponding to a region of interest of the image, and entropy-encoding the shifted-up bits and bits of transform coefficients corresponding to a remaining region; generating first bitmap data by expanding the compressed data; interpreting the compressed data to discriminate a portion of the region of interest and a remaining portion in the first bitmap data; and executing image processes of the portion of the region of interest and the remaining portion using different parameters on the basis of a discrimination result in the interpreting step to convert the portions into second bitmap data.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIGS. 3A to 3D show a print image and its intermediate data, and the rendering results of bitmaps 1 and 2;

FIG. 4 is a schematic block diagram for explaining the arrangement of an image encoder in a host computer;

FIGS. 8A to 8D are schematic views showing the format of a code sequence generated and output by the host computer in the embodiment of the present invention;

FIGS. 9A to 9D are schematic views showing the format of a code sequence generated and output by the host computer in the embodiment of the present invention;

FIGS. 12A and 12B are block diagrams showing the arrangement and process of an inverse wavelet transformer in the embodiment of the present invention;

DESCRIPTION OF THE PREFERRED EMBODIMENTS

A preferred embodiment of the present invention will be described in detail hereinafter with reference to the accompanying drawings.

Figure 1:
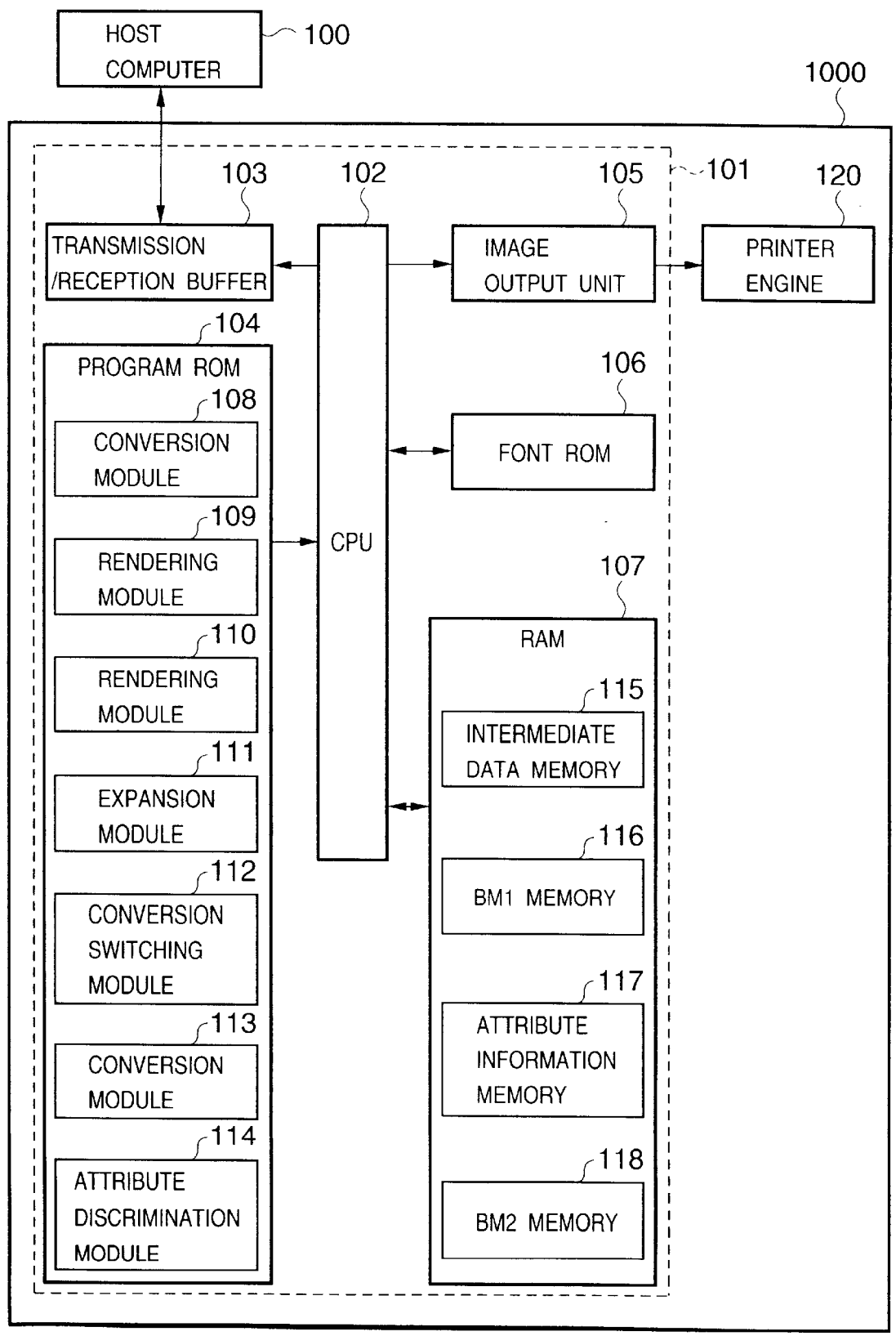
FIG. 1 is a schematic block diagram for explaining the functional arrangement of a color printer according to an embodiment of the present invention.

FIG. 1 is a block diagram for explaining the functional arrangement of a color printer according to an embodiment of the present invention. Note that a color laser beam printer 1000 will be exemplified as a color printer, but the present invention is not limited to such specific printer.

Referring to FIG. 1, reference numeral 100 denotes a host computer which sends print data to the color printer 1000 as an external apparatus of the color printer 1000. The host computer 100 is connected to a control unit 101 (indicated by the broken line) of the color printer 1000 via a connector, network, and the like. The control unit 101 receives print data such as a rendering command, setup command data, and the like from the host computer 100, develops it to a bitmap image, and prints the image via a printer engine 120.

Reference numeral 102 denotes a CPU which controls the operation of the overall control unit 101, and executes various arithmetic operations and the like to systematically control the color printer 1000. Reference numeral 103 denotes a transmission/reception buffer for temporarily storing transmission/reception data to be exchanged with the host computer 100. Reference numeral 104 denotes a program ROM which stores programs and the like to be executed by the CPU 102 so as to implement a series of print control processes. Reference numeral 105 denotes an image output unit which outputs image data stored in a bitmap 2 (BM2) memory 118 to the printer engine 120. Reference numeral 106 denotes a font ROM which stores character font data. Reference numeral 107 denotes a RAM which serves as a work area and various data memories when the CPU 102 executes programs stored in the program ROM 104. Furthermore, a power supply device (not shown) is connected to the control unit 101.

The program ROM 104 stores, as programs, a conversion module 108 for converting a rendering command stored in the transmission/reception buffer 103 into intermediate data used to generate bitmap 1 (BM1), and storing the converted data in an intermediate data memory 115, an attribute discrimination module 114 for converting a rendering command stored in the transmission/reception buffer 103 into attribute information data used to generate bitmap 2 (BM2), and storing the converted data in the intermediate data memory 115, an expansion module 111 for expanding a rendering command stored in the transmission/reception buffer 103, a rendering module 109 for developing bitmap 1 based on intermediate data stored in the intermediate data memory 115, and storing the bitmap data in a bitmap 1 (BM1) memory 116, a rendering module 110 for generating bitmap 2 (BM2) on the basis of attribute information data of intermediate data stored in the intermediate data memory 115, and storing it in the bitmap 2 (BM2) memory 118, a conversion module 113 for converting data in the bitmap 1 memory 116 into bitmap 2 (BM2) with reference to attribute information of the bitmap 2 (BM2) memory 118 in accordance with attribute information, and storing the data in the bitmap 2 (BM2) memory 118, and a conversion switching module 112 for switching conversion processes in correspondence with attribute information in an attribute information memory 117, upon conversion by the conversion module 113.

Note that bitmap 1 (BM1) is 24-bit data obtained by expressing one pixel by 8-bit R, G, and B data, and bitmap 2 (BM2) is 32-bit data obtained by expressing one pixel by 8-bit Y, M, C, and K data.

The RAM 107 comprises the intermediate data memory 115 for storing intermediate data converted by the conversion module 108, the bitmap 1 (BM1) memory 116 for storing bitmap 1 (BM1) rendered by the rendering module 109, the attribute information memory 117 for storing an attribute bitmap rendered by the rendering module 110, and the bitmap 2 (BM2) memory 118 for storing bitmap 2 (BM2) converted by the conversion module 113.

Note that this embodiment exemplifies the color printer 1000 as a printing apparatus, but the present invention may be applied to a laser beam printer (color laser printer) or digital copying machine that can print using a plurality of colors, or to a color printer such as a color ink-jet printer, color thermal transfer printer, or the like. Furthermore, the present invention may be applied to a monochrome printing apparatus in place of the color printing apparatus.

The functions of the respective modules such as the conversion modules, rendering modules, and the like are implemented by programs in this embodiment, but may be implemented by dedicated hardware.

An example of the operation of the color printer 1000 according to this embodiment will be explained below with reference to the flow chart shown in FIG. 2.

Figure 2:
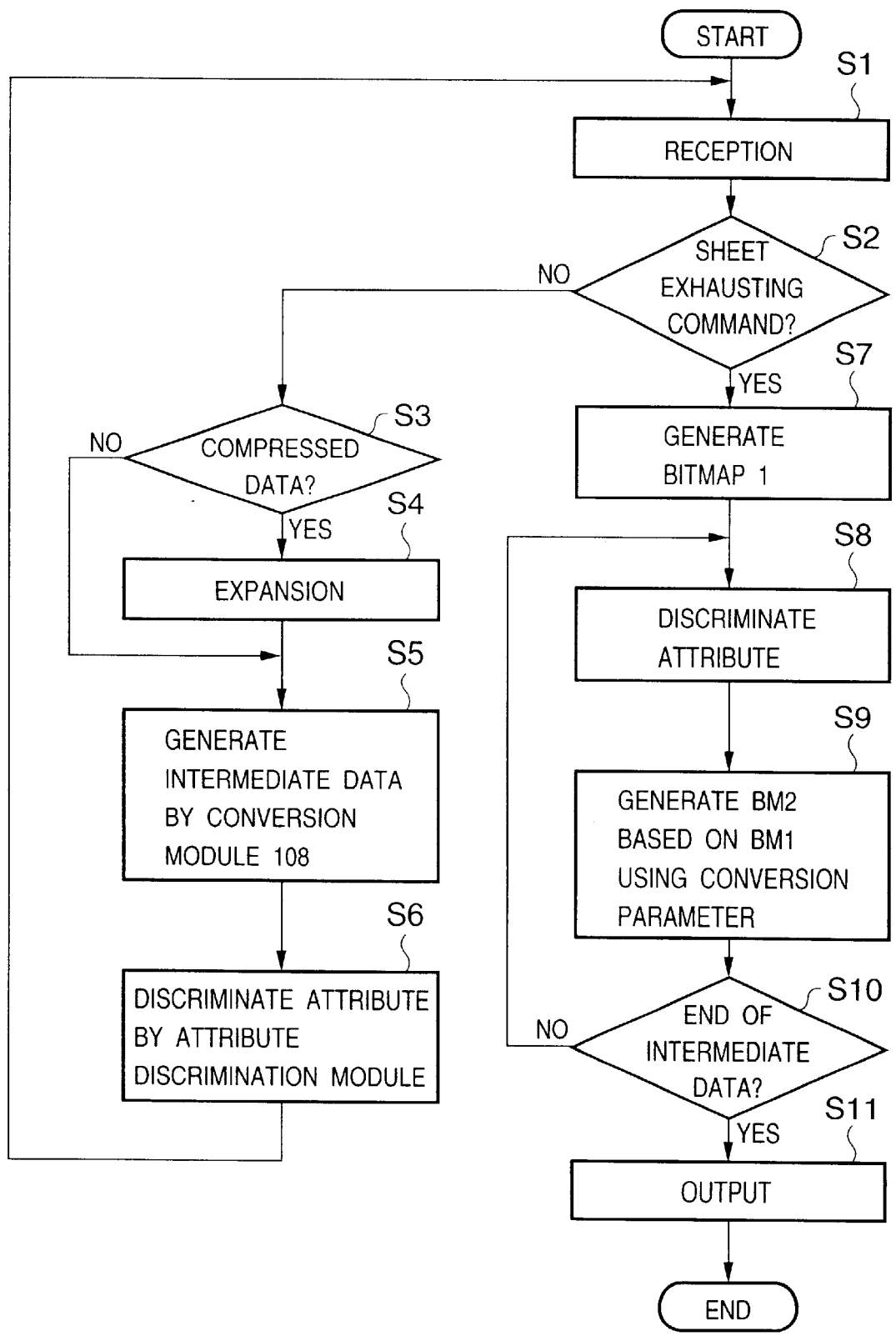
FIG. 2 is a flow chart for explaining an example of a data processing sequence in the color printer according to the embodiment of the present invention.

FIG. 2 is a flow chart for explaining an example of the data processing sequence in the color printer 1000 according to this embodiment, and corresponds to a control processing sequence by the control unit 101 shown in FIG. 1.

In step S1, the control unit 101 receives print data from the host computer 100. The received print data is temporarily stored in the transmission/reception buffer 103. After the print data is stored in the transmission/reception buffer 103, the print data is read in units of input commands. In step S2, the CPU 102 interprets the print data read in units of input commands, and checks if the input command is a sheet exhausting command. If the CPU 102 determines that the input command is the sheet exhausting command, the flow advances to step S7; otherwise, the flow advances to step S3.

It is checked in step S3 if the input command is compressed data. If the input command is data compressed by a method to be described later, the flow advances to step S4, and the expansion module 111 expands the compressed data. If the input command is not data compressed by that method, the flow advances to step S5. In this embodiment, an expansion process is done even when data compressed by a method different from that to be described later is input, but a detailed description thereof will be omitted since such process is not directly related to the present invention.

In step S5, the conversion module 108 shown in FIG. 1 converts a rendering command into intermediate data, and stores the converted intermediate data in the intermediate data memory 115. The flow then advances to step S6. In step S6, the attribute discrimination module 114 interprets the command type or parameters of input data, or the contents of compressed data, generates at least one kind of attribute information (e.g., type information indicating character, graphic, image, or the like) in units of rendering objects, and stores the generated information in the intermediate data memory 115. The flow then returns to step S1.

On the other hand, if it is determined in step S2 that the input command is the sheet exhausting command, the flow advances to step S7. In step S7, the rendering module 109 reads out intermediate data stored in the intermediate data memory 115 in units of rendering objects, renders them as a bitmap as a total of 24-bit RGB data per pixel, and stores it in the bitmap 1 (BM1) memory 116. Furthermore, the rendering module 110 reads out intermediate data stored in the intermediate data memory 115 in units of rendering objects, renders them as an attribute bitmap of 2 bits/pixel using attributes included in the intermediate data, and stores it in the attribute information memory 117. Upon completion of rendering of all intermediate data for one page stored in the intermediate data memory 115, the flow advances to step S8.

In step S8, the conversion switching module 112 acquires the rendering result for one page stored in the bitmap 1 (BM1) memory 116 and attribute information for one page stored in the attribute information memory 117 for each given block, discriminates the attribute of that block on the basis of the contents of the attribute information, and switches the conversion process parameters used in step S9 to optimal ones in accordance with the discrimination result. The flow then advances to step S9. Note that each block preferably has a size as small as an area in which attributes are not intricately broken up. If a plurality of attributes are present in one block, one attribute is assigned by a majority decision based on the occupied areas of the attributes. In step S9, the conversion module 113 converts bitmap 1 (BM1) into bitmap 2 (BM2) as 32-bit YMCK data per pixel, and stores it in the bitmap 2 (BM2) memory 118. The flow then advances to step S10 to check if all processing blocks in the bitmap 1 memory 116 have been converted. If processing blocks to be converted still remain, the flow returns to step S8; otherwise, the flow advances to step S11.

Before executing step S11, the compressed bitmap in the bitmap 1 memory 116 and the attribute bitmap in the attribute information memory 117 may be deleted.

The flow advances to step S11 in this way, and the image output unit 105 outputs image data stored in the bitmap 2 (BM2) memory 118 to the printer engine 120.

Note that the color spaces and bit depths of bitmaps 1 and 2 in this embodiment are not limited to the values of the above embodiment, but arbitrary values may be used.

Note that this embodiment executes color conversion as the conversion process from bitmap 1 to bitmap 2 in step S9, but may execute half-toning process. For example, bitmap data as a total of 24-bit RGB data per pixel may be converted into a total of 4-bit YMCK data per pixel (1 bit/pixel for each color). Also, data compression may be done at the same time. In this case, bitmap 2 is expanded and output in step S11.

A general attribute discrimination method by the attribute discrimination module 114 in step S6 will be explained below.

FIGS. 3A to 3D show an example of print data, its print result, and its attribute data. More specifically, FIG. 3A shows a desired print result, FIG. 3B shows an example of intermediate data of rendering data shown in FIG. 3A, FIG. 3C shows the rendering result of bitmap 1 (BM1), and FIG. 3D shows the rendering result of bitmap 2 (BM2).

It is checked first if a command contained in the received print data is a character, graphic, or image command, and a corresponding flag is assigned to intermediate data to be stored in the intermediate data memory 115 (FIG. 3B).

More specifically, an attribute =character, print positions (x, y), fonts, sizes, character codes, and colors of a character string 300 are defined as "Object 1". Also, an attribute= graphic, print position (x, y), shape (circle), radius, and color of a graphic image 301 are defined as "Object 2". Furthermore, an attribute=image, print position (x, y), image width and height, pointer to an image entity, and the like of an image 302 are defined as "Object 3".

These intermediate data contain information of the shapes, colors, and print positions of the individual rendering objects. When intermediate data are rendered by the rendering module 109, a result equivalent to the desired print result can be obtained (FIG. 3C). When intermediate data are rendered by the rendering module 110, attribute information (stored in the attribute information memory 117) having attributes corresponding to individual pixels of the print result can be obtained (FIG. 3D).

This attribute information is expressed by 2-bit information for each pixel like "0×1" for a character region, "0×2" for a graphic region, "0×3" for an image region, and "0×0" for any remaining region. Note that the discrimination process may be done based on parameters (character, graphic, image) appended to input commands.

A compression unit (encoder; not shown) of the host computer 100 and the expansion module (decoder) 111 of the color printer 1000 will be explained below.

[Encoder]

In this embodiment, the host computer 100 compresses image data, sends that compressed image data to the color printer 1000 according to this embodiment, and controls the printer 1000 to print. FIG. 4 is a schematic block diagram for explaining an image encoder (compression unit) for compressing image data in the host computer 100.

Referring to FIG. 4, reference numeral 1 denotes an image input unit; numeral 2 denotes a discrete wavelet transformer; numeral 3 denotes a quantizer; numeral 4 denotes an entropy encoder; numeral 5 denotes a code output unit; and numeral 11 denotes a region designation unit.

The image input unit 1 outputs image data that form an image to be encoded in the raster scan order, and outputs them to the discrete wavelet transformer 2. In the following description, image data represent a monochrome multi-valued image. However, when a plurality of color components of a color image or the like are to be encoded, each of R, G, and B color components or luminance and chromaticity components can be compressed as the monochrome component.

The discrete wavelet transformer 2 executes a two-dimensional wavelet transformation process for the input image data, and computes and outputs transform coefficients.

Figure 5A:
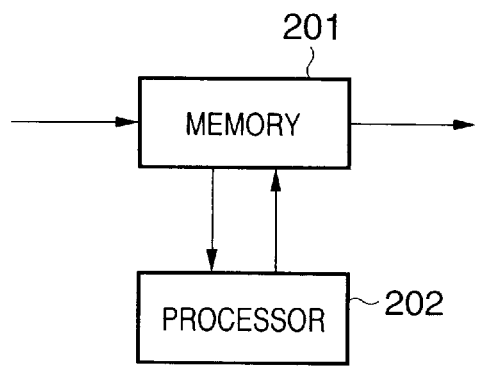
FIGS. 5A to 5C are views for explaining discrete wavelet transformation according to the embodiment of the present invention.

FIG. 5A is a block diagram showing the basic arrangement of this discrete wavelet transformer 2. Input image data are stored in a memory 201, are sequentially read out by a processor 202 to undergo the transformation process, and are written in the memory 201 again.

Figure 5B:
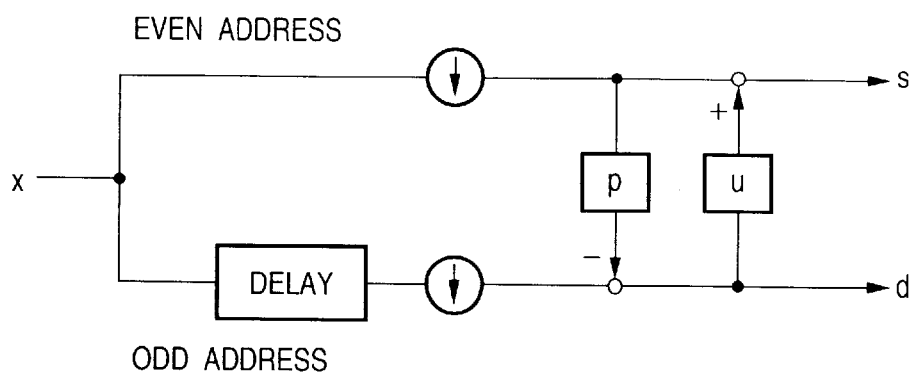

Note that the arrangement of the processes in the processor 202 in this embodiment is as shown in FIG. 5B. In FIG. 5B, the input image data is separated into odd and even address signals by a combination of a delay element and down samplers, and these signals undergo filter processes of two filters p and u. In FIG. 5B, s and d represent low- and high-pass coefficients upon decomposition of linear image data at one level, respectively, and are respectively computed by:

$$d(n) = x(2n+1) - \text{floor}[\{x(2n) + x(2n+2)\}/2] \quad (1)$$

$$s(n) = x(2n) + \text{floor}[\{d(n-1) + d(n)\}/4] \quad (2)$$

where $x(n)$ is image data to be transformed.

In this manner, the linear discrete wavelet transformation process is performed for image data. Since two-dimensional discrete wavelet transformation is implemented by sequentially executing linear transformation in the horizontal and vertical directions of an image and its details are known to those who are skilled in the art, a description thereof will be omitted.

Figure 5C:
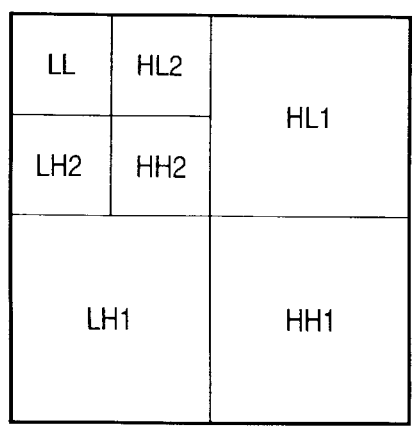

FIG. 5C shows an example of transformation coefficient groups of two levels obtained by the two-dimensional discrete wavelet transformation process. Image data is decomposed into coefficient sequences HH1, HL1, LH1, ..., LL in different frequency bands. Note that these coefficient sequences will be referred to as subbands hereinafter. The coefficients of the individual subbands are output to and quantized by the quantizer 3.

The region designation unit 11 determines an ROI (Region Of Interest) to be decoded to have higher image quality than the surrounding portions in an image to be encoded, and generates mask information indicating coefficients that belong to the ROI upon computing the discrete wavelet transforms of the image to be encoded. Note that the ROI is preferably designated for a character region that requires a higher-image quality process than image and graphic portions in this embodiment.

Figure 6A:
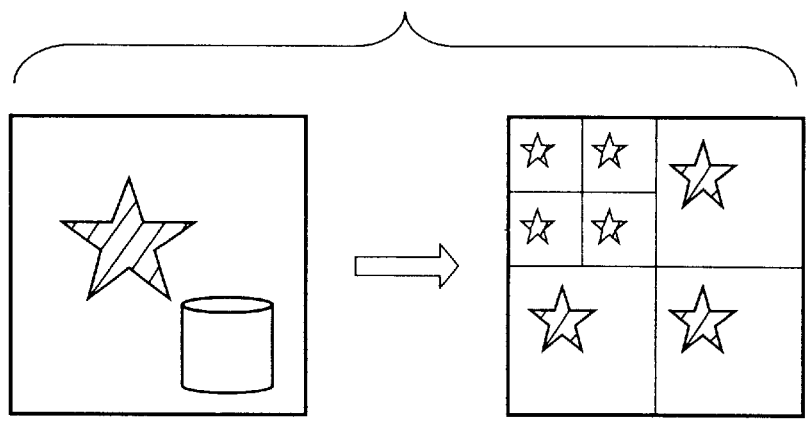
FIGS. 6A to 6C are views for explaining a bit shift process of wavelet transform coefficients.

FIG. 6A shows an example upon generating mask information. Assuming that a star-shaped region is designated by a predetermined instruction input, as shown in the left image in FIG. 6A, the region designation unit 11 computes portions to be included in respective subbands upon computing the discrete wavelet transforms of the image including this designated region. The region indicated by this mask information corresponds to a range including transform coefficients of the surrounding region required for reconstructing an image signal on the boundary of the designated region.

The right image in FIG. 6A shows an example of the mask information computed in this way. In this example, mask information upon discrete wavelet transformation of the left image at two levels in FIG. 6A is computed, as shown in FIG. 6A. In FIG. 6A, a star-shaped portion corresponds to the designated region, bits of the mask information in this designated region are set at "1", and other bits of the mask information are set at "0". Since the entire mask information has the same format as transform coefficients of two-dimensional discrete wavelet transformation, whether or not a coefficient at a given position belongs to the designated region can be identified by checking the corresponding bit in the mask information. The mask information generated in this manner is output to the quantizer 3.

Furthermore, the region designation unit 11 receives parameters for designating image quality of that designated region from an input system (not shown). These parameters may be either numerical values that express a compression ratio to be assigned to the designated region or those indicating image quality. The region designation unit 11 computes a bit shift amount B for coefficients in the designated region, and outputs it to the quantizer 3 together with the mask information.

The quantizer 3 quantizes the input coefficients by a predetermined quantization step $\Delta$, and outputs indices corresponding to the quantized values. In this case, quantization is described by:

$$q = \mathrm{sign}(c)\mathrm{floor}\{\mathrm{abs}(c)/\Delta\} \quad (3)$$

$$\mathrm{sign}(c) = 1;\ c \geq 0 \quad (4)$$

$$\mathrm{sign}(c) = -1;\ c < 0 \quad (5)$$

where abs(c) is the absolute value of c, and floor{X} is a maximum integer value smaller than X. Also, c is a coefficient to be quantized. In this embodiment, the quantization step value $\Delta$ includes "1". However, when $\Delta=1$, no quantization is done in practice.

The quantizer 3 changes the quantization index on the basis of the mask and shift amount B input from the region designation unit 11 by:

$$q'=q\times 2^B;\ m=1 \quad (6)$$

$$q'=q;\ m=0 \quad (7)$$

where m is the mask value at the position of the quantization index of interest. With the aforementioned process, only quantization indices that belong to the spatial region designated by the region designation unit 11 are shifted to the MSB side by B bits.

Figure 6B:
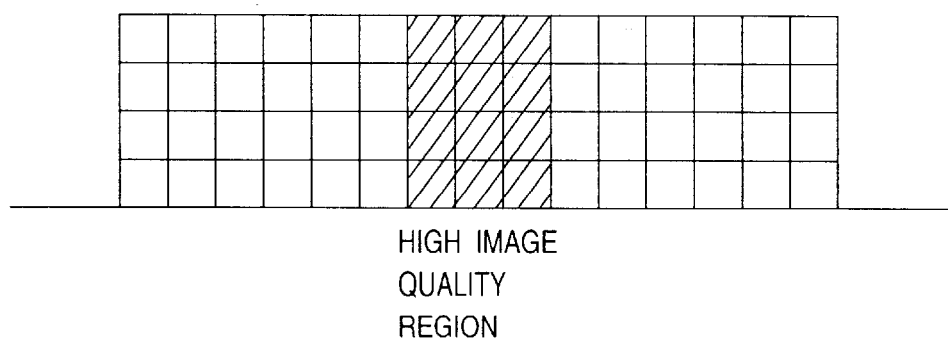
Figure 6C:
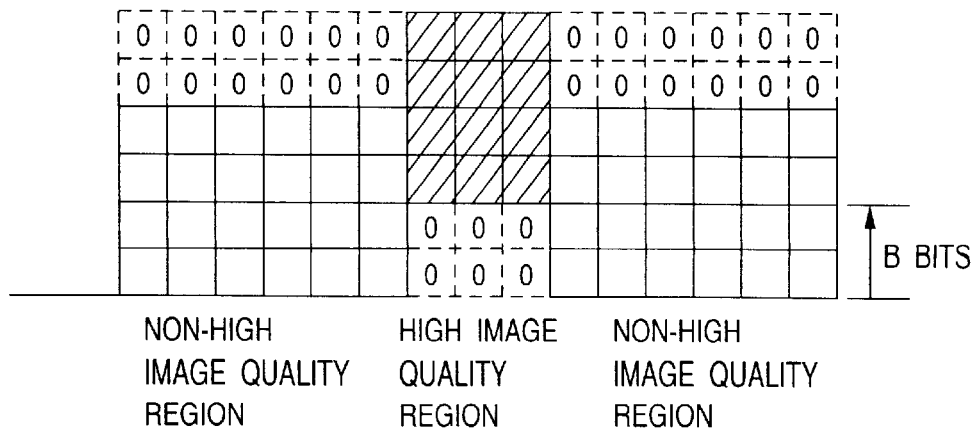

FIGS. 6B and 6C show changes in quantization index by the shift-up process. FIG. 6B shows quantization indices of given subbands. When the mask value="1" and the shift value B="2" in the hatched quantization indices, the quantization indices after bit shifts are as shown in FIG. 6C. Note that bits "0" are stored in blanks formed as a result of this bit shift-up process, as shown in FIG. 6C.

The quantization indices changed in this manner are output to the entropy encoder 4.

Note that the mask in this embodiment is used not only in the shift-up process but also to accurately restore an original image from data obtained after encoding by the entropy encoder 4. However, the present invention is not limited to this. For example, if the shift value B is set to be equal to the number of bits of each quantization index which is to undergo the bit shift process (see FIGS. 6A to 6C), a decoder can easily discriminate the ROI and other regions from the encoded bit stream without receiving any mask information, and can accurately restore an original image.

The entropy encoder 4 segments the quantization indices input from the quantizer 3 into bit planes, executes binary arithmetic coding in units of bit planes, and outputs a code stream.

Figure 7:
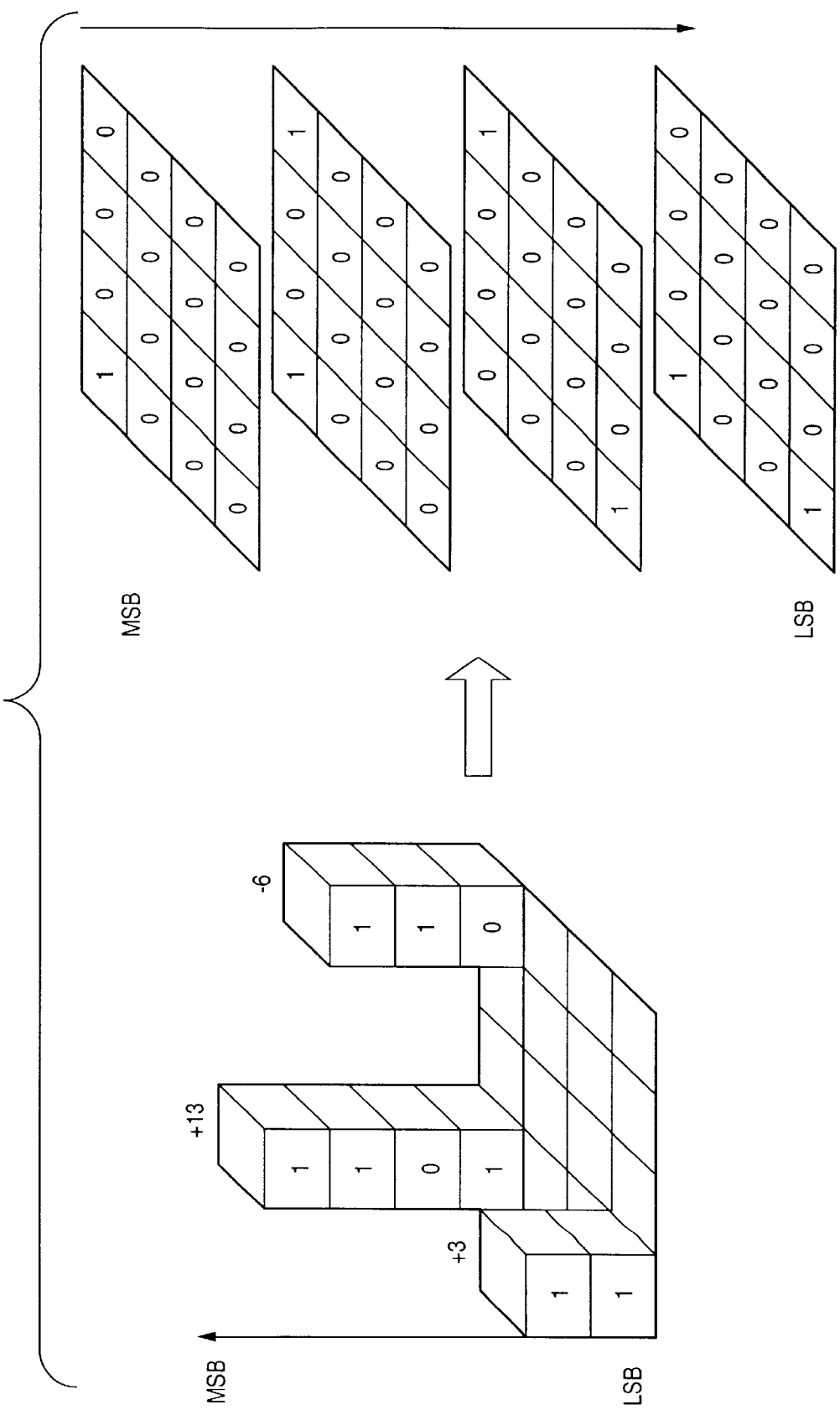
FIG. 7 is a view for explaining the operation of an entropy encoder according to the embodiment of the present invention.

FIG. 7 is a view for explaining the operation of the entropy encoder 4. In this example, a 4×4 subband region includes three nonzero indices, which respectively have values "+13", "−6", and "+3". The entropy encoder 4 scans this region to obtain a maximum value M, and computes the number S of bits required for expressing the maximum quantization index by:

$$S=\mathrm{ceil}[\log_2\{\mathrm{abs}(M)\}] \quad (8)$$

where ceil(x) is the smallest one of integers equal to or larger than x. In FIG. 7, since the maximum coefficient value is "13", the value of the number S of bits is "4", and 16 quantization indices in the sequence are processed in units of four bit planes, as indicated by the right side in FIG. 7.

The entropy encoder 4 makes binary arithmetic coding of bits of the most significant bit plane (indicated by MSB) and outputs the coding result as a bit stream. Then, the encoder 4 lowers the bit plane by one level, and encodes and outputs bits of each bit plane to the code output unit 5 until the bit plane of interest reaches the least significant bit plane (indicated by LSB). At this time, a code of each quantization index is entropy-encoded immediately after the first nonzero bit is detected upon scanning the bit plane.

FIGS. 8A to 8D show the format of a code sequence to be generated and output in this fashion.

FIG. 8A shows the overall format of a code sequence, in which MH is a main header; THi, a tile header; and BSi, a bit stream. The main header MH is comprised of the size (the numbers of pixels in the horizontal and vertical directions) of an image to be encoded, a tile size upon segmenting the image into tiles as a plurality of rectangular regions, the number of components indicating the number of color components, the size of each component, and component information indicating bit precision, as shown in FIG. 8B. In this embodiment, since an image is not segmented into tiles, the tile size is equal to the image size, and when the image to be encoded is a monochrome multi-valued image, the number of components is "1".

FIG. 8C shows the format of the tile header THi.

The tile header THi consists of a tile length including the bit stream length and header length of the tile of interest, an encoding parameter for the tile of interest, mask information indicating the designated region, and the bit shift amount for coefficients that belong to the designated region. The encoding parameter includes a discrete wavelet transform level, filter type, and the like.

FIG. 8D shows the format of a bit stream in this embodiment.

In FIG. 8D, the bit stream is formed in units of subbands, which are arranged in turn from a subband having a low resolution in ascending order of resolution. Furthermore, in each subband, codes are set in units of bit planes, i.e., in the order from an upper bit plane to a lower bit plane.

With this code sequence, hierarchical decoding shown in FIGS. 13A and 13B (to be described later) can be done.

FIGS. 9A to 9D are schematic views for explaining the format of a code sequence to be generated and output in this way.

FIG. 9A shows the overall format of a code sequence, in which MH is a main header; TH, a tile header; and BS, a bit stream. The main header MH is comprised of the size (the numbers of pixels in the horizontal and vertical directions) of an image to be encoded, a tile size upon segmenting the image into tiles as a plurality of rectangular regions, the number of components indicating the number of color components, the size of each component, and component information indicating bit precision, as shown in FIG. 9B. In this embodiment, since an image is not segmented into tiles, the tile size is equal to the image size, and when the image to be encoded is a monochrome multi-valued image, the number of components is "1".

FIG. 9C shows the format of the tile header TH.

The tile header TH consists of a tile length including the bit stream length and header length of the tile of interest, an encoding parameter for the tile of interest, mask information indicating the designated region, and the bit shift amount for coefficients that belong to the designated region. The encoding parameter includes a discrete wavelet transform level, filter type, and the like.

FIG. 9D shows the format of a bit stream in this embodiment.

Referring to FIG. 9D, the bit stream is formed in units of bit planes, which are set in the order from an upper bit plane to a lower bit plane. In the bit planes, the encoding results of the bit planes of a given quantization index in each subband are sequentially set in units of subbands. In FIG. 9D, S indicates the number of bits required for expressing the maximum quantization index. The code sequence generated in this manner is output to the code output unit 5.

With this code sequence, hierarchical decoding shown in FIGS. 14A and 14B (to be described later) can be done.

In the aforementioned embodiment, the compression ratio of the entire image to be encoded can be controlled by changing the quantization step Δ.

As another method, in this embodiment, lower bits of a bit plane to be encoded by the entropy encoder 4 can be limited (discarded) in correspondence with a required compression ratio. In this case, not all bit planes are encoded, but bit planes from the most significant bit plane to a bit plane corresponding in number to the required compression ratio are encoded and included in a final code sequence.

In this manner, by adopting a function of limiting lower bit planes, only bits corresponding to the designated region are included in large quantity in the code sequence, as shown in FIGS. 6A to 6C. That is, since only the designated region can be compressed at a low compression ratio, it can be encoded as a high-quality image.

[Decoder]

The expansion module 111 (FIG. 1) of the color printer 1000 which receives and decodes the bit stream encoded by the aforementioned image encoder (FIG. 4) will be explained below.

Figure 10:
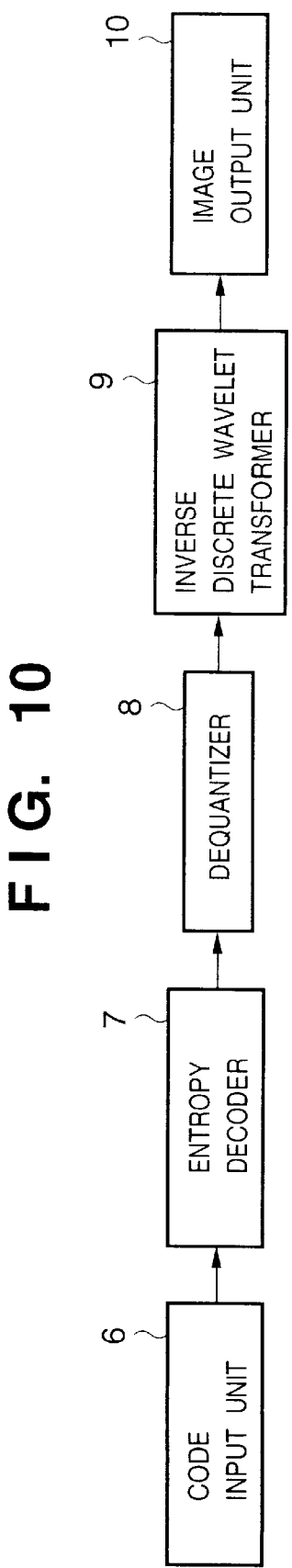
FIG. 10 is a block diagram showing the arrangement of an expansion unit of the color printer according to the embodiment of the present invention.

FIG. 10 is a block diagram showing the arrangement of the expansion module 111 according to this embodiment. Reference numeral 6 denotes a code input unit; numeral 7 denotes an entropy decoder; numeral 8 denotes a dequantizer; numeral 9 denotes an inverse discrete wavelet transformer; and numeral 10 denotes an image output unit.

The code input unit 6 receives a code sequence encoded by, e.g., the aforementioned image encoder of the host computer 100, interprets the header included in that sequence to extract parameters required for the subsequent processes, and controls the flow of processes if necessary or outputs required parameters to the subsequent processing units. The bit streams included in the input code sequence are output to the entropy decoder 7.

Figure 11:
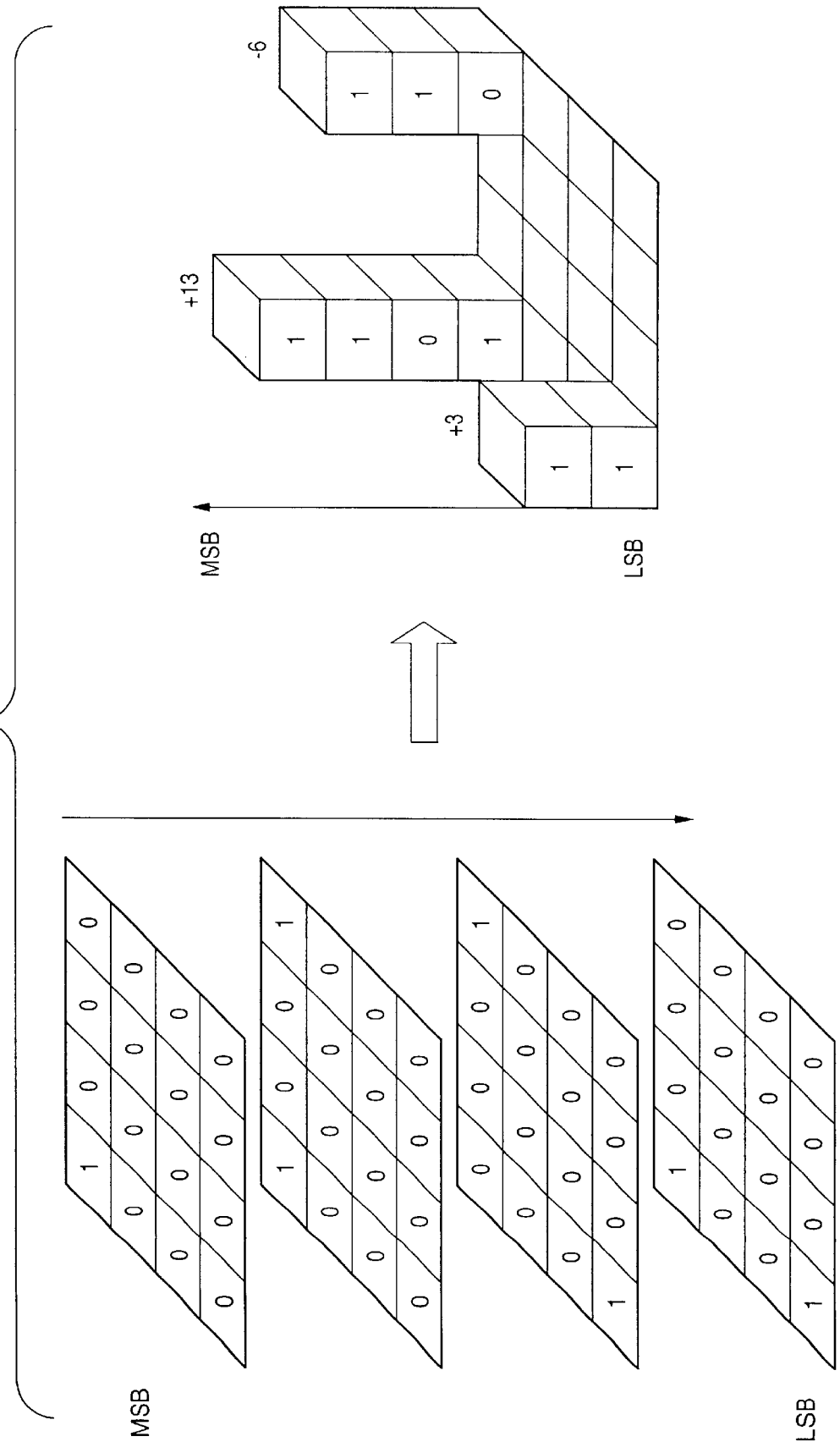
FIG. 11 is a view for explaining a decoding sequence in the expansion unit of the embodiment of the present invention.

The entropy decoder 7 decodes and outputs the bit streams in units of bit planes. FIG. 11 shows the decoding sequence at that time.

The left side in FIG. 11 illustrates the flow for sequentially decoding one subband region to be decoded in units of bit planes to finally restore a quantization index, and bit planes are decoded in the order of an arrow. The restored quantization indices are output to the dequantizer 8.

Figure 16:
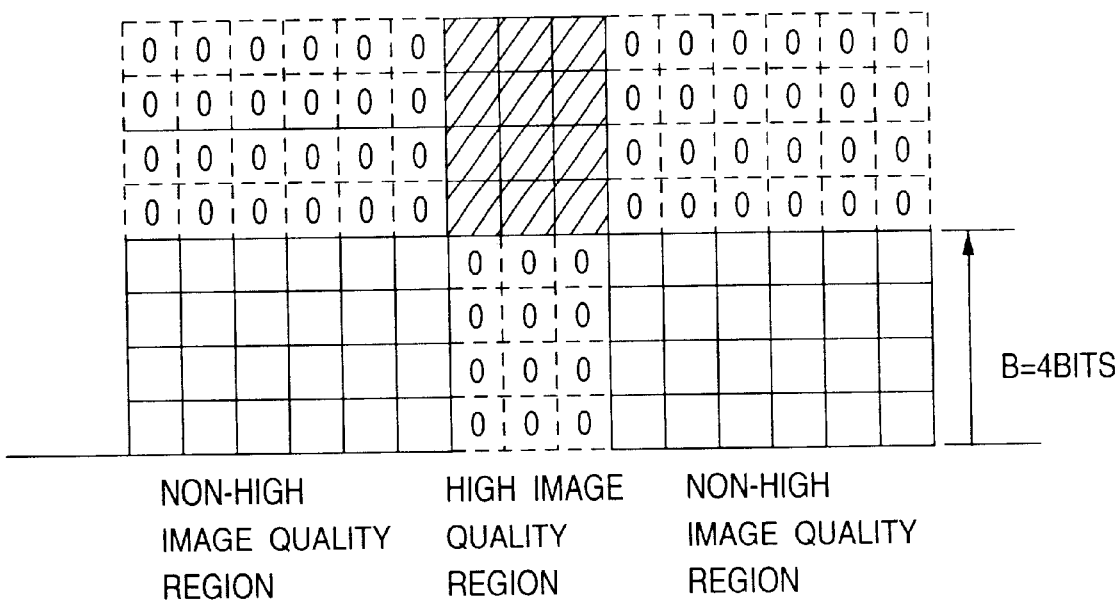
FIG. 16 shows an example of an encoded image.

The dequantizer 8 reclaims discrete wavelet transform coefficients from the quantization indices input from the entropy decoder 7 by:

$$c' = \Delta \times q/2^U; \quad q \neq 0 \qquad (11)$$

$$c' = 0; \quad q = 0 \qquad (12)$$

$$U = B; \quad m = 1 \qquad (13)$$

$$U = 0; \quad m = 0 \qquad (14)$$

where q is the quantization index, and Δ is the quantization step, which is the same value used upon encoding. B is the bit shift amount read out from the tile header, and m is the mask value at the position of the quantization index of interest. c' is the restored transform coefficient, which is obtained by restoring a coefficient s or d in encoding. This transform coefficient c' is output to the inverse discrete wavelet transformer 9. Note that the mask need not always be received and used by the decoder depending on the bit shift amount B, as described above. That is, since an image is encoded in a state shown in FIG. 16, the ROI and other regions can be discriminated from each other by detecting the presence of bits "0" in the encoded bit stream.

FIGS. 12A and 12B are block diagrams showing the arrangement and process of the inverse wavelet transformer 9.

Referring to FIG. 12A, the input transform coefficients are stored in a memory 901. A processor 902 executes a linear inverse discrete wavelet transform process while sequentially reading out the transform coefficients from the memory 901, thus implementing a two-dimensional inverse discrete wavelet transform process. The two-dimensional inverse discrete wavelet transform process is executed in a sequence opposite to the forward discrete wavelet transform, but since its details are known to those who are skilled in the art, a description thereof will be omitted. FIG. 12B shows the arrangement of the processor 902. The input transform coefficients undergo two filter processes of filters u and p, and are added after being up-sampled, thus outputting an image signal x'. These processes are described by:

$$x'(2n) = s'(n) - \text{floor}\,[\{d'(n-1) + d'(n)\}/4] \quad (15)$$

$$x'(2n+1) = d'(n) + \text{floor}\,[\{x'(2n) + x'(2n+2)\}/2] \quad (16)$$

Since the forward and inverse discrete wavelet transform processes given by equations (1), (2), (15), and (16) satisfy a perfect reconstruction condition, the restored image signal x' matches the original image signal x as long as the quantization step Δ is "1" and all bit planes are decoded in bit plane decoding in this embodiment.

With the aforementioned process, the original image is reproduced and is output to the image output unit 10. Note that the image output unit 10 may be an image display device such as a monitor or the like, or may be a storage device such as a magnetic disk or the like.

The image display pattern upon restoring and displaying an image in the aforementioned sequence will be explained using FIGS. 13A and 13B.

Figure 13A:
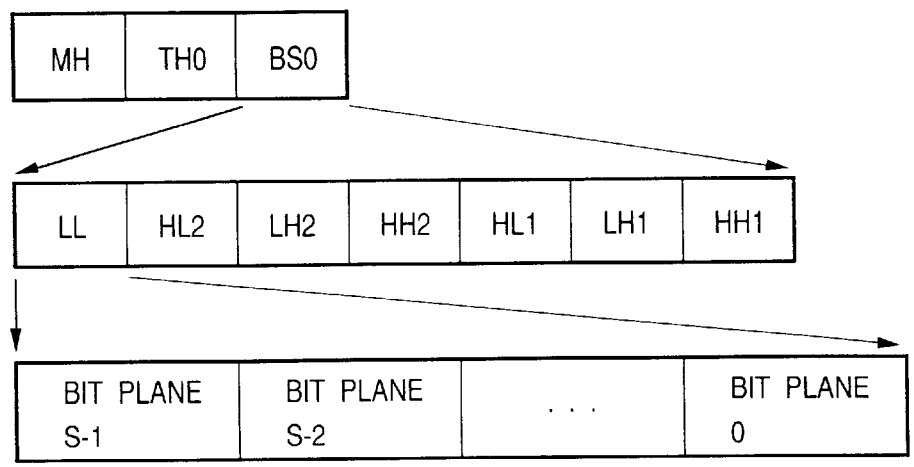
FIGS. 13A and 13B are views for explaining the output patterns of an image upon restoring an image in the embodiment of the present invention.
Figure 13B:
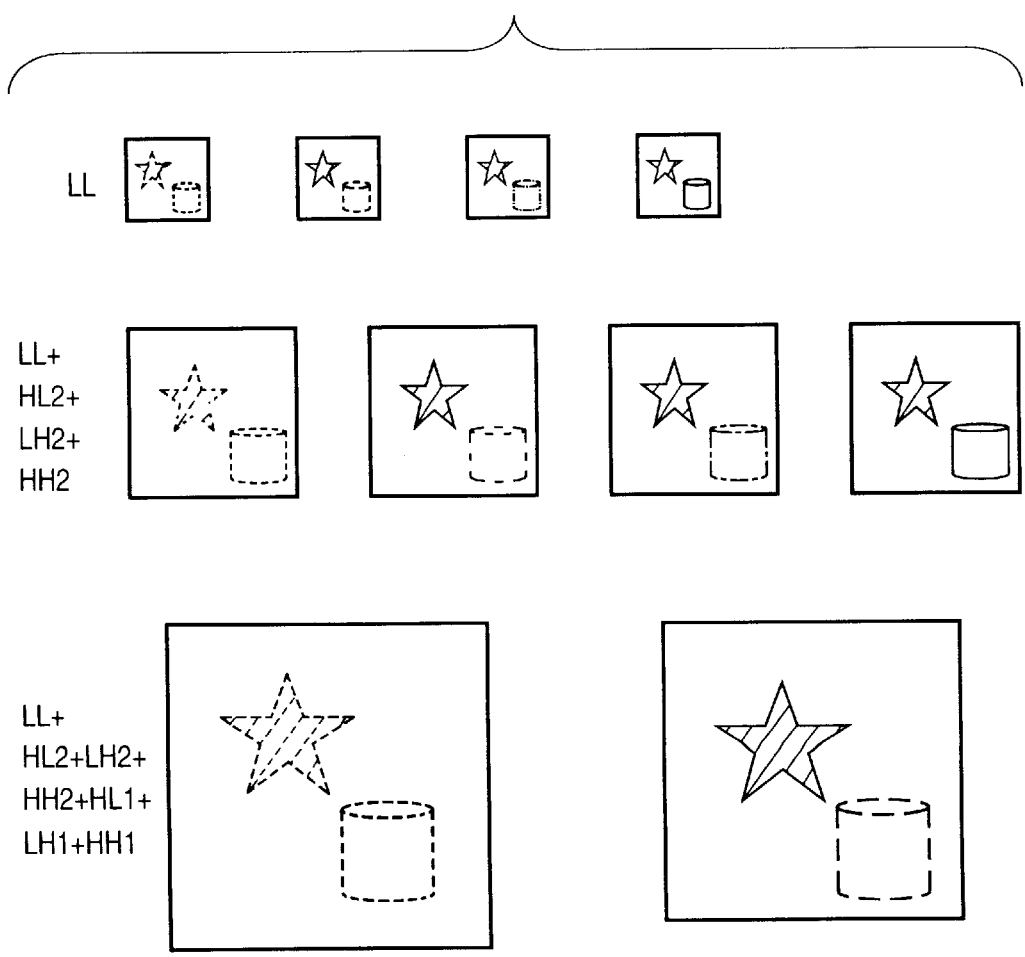

FIG. 13A shows an example of a code sequence, the basic format of which is based on FIGS. 8A to 8D. In this case, the entire image is set as a tile and, hence, the code sequence includes only one tile header and bit stream. In this bit stream BSO, codes are set in turn from LL as a subband corresponding to the lowest resolution to HH1 in ascending order of resolution. Furthermore, in each subband, codes are set from an upper bit plane to a lower bit plane.

The expansion module 111 sequentially reads this bit stream, and displays an image upon completion of decoding of codes of each bit plane. FIG. 13B shows the respective subbands, the sizes of images to be displayed in correspondence with the subbands, and changes in image upon decoding a code sequence of each subband. In FIG. 13B, a code sequence corresponding to LL is sequentially read out, and the image quality gradually improves along with the progress of the decoding processes of the respective bit planes. At this time, the star-shaped portion used as the designated region upon encoding is reproduced with high image quality earlier than other portions.

This is because the quantizer 3 shifts up the quantization indices which belong to the designated region upon encoding, and these quantization indices are decoded at earlier timings than other portions upon bit plane decoding. The same applies to other resolutions, i.e., the designated region portion is decoded with higher image quality.

Furthermore, upon completion of decoding of all the bit planes, the designated region portion and other portions have equal image quality. However, when decoding is interrupted in the middle of the processes, an image with the designated region portion reproduced to have higher image quality than other regions can be obtained.

The image display pattern upon restoring and displaying an image in the aforementioned sequence will be explained using FIGS. 14A and 14B.

Figure 14A:
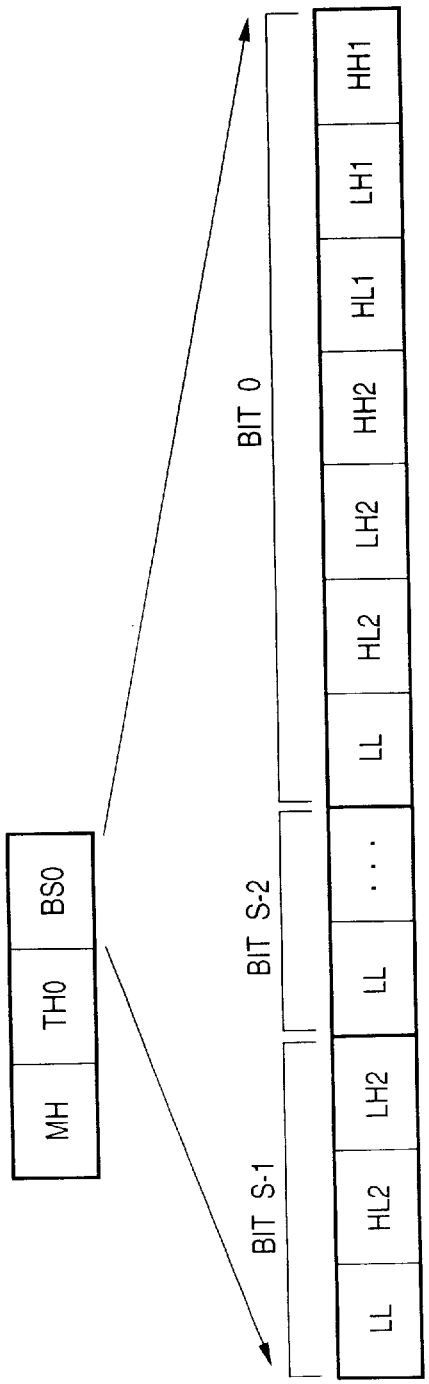
FIGS. 14A and 14B are views for explaining the output patterns of an image upon restoring an image in the embodiment of the present invention.
Figure 14B:
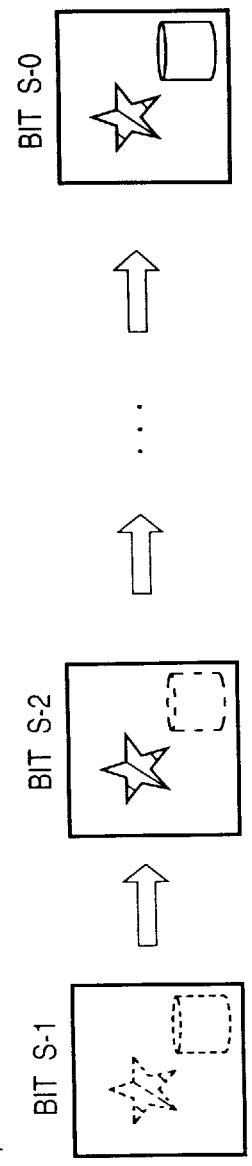

FIG. 14A shows an example of a code sequence, the basic format of which is based on FIGS. 9A to 9D, but the entire image is set as a tile in this case. Hence, the code sequence includes only one tile header and bit stream. In this bit stream BSO, codes are set from the most significant bit plane to the least significant bit plane, as shown in FIG. 14A.

The expansion module 111 sequentially reads this bit stream, and displays an image upon completion of decoding of codes of each bit plane. In FIG. 14B, as the decoding processes of the respective bit planes progress, the image quality gradually improves. In this case, the star-shaped portion used as the designated region upon encoding is reproduced with high image quality earlier than other portions.

This is because the quantizer 3 shifts up the quantization indices which belong to the designated region upon encoding, and these quantization indices are decoded at earlier timings than other portions upon bit plane decoding.

Furthermore, upon completion of decoding of all the bit planes, the designated region portion and other portions have equal image quality. However, when decoding is interrupted in the middle of the processes, an image with the designated region portion reproduced to have higher image quality than other regions can be obtained.

In the aforementioned embodiment, when the entropy decoder 7 limits (ignores) lower bit planes to be decoded, the encoded data to be received or processed is reduced, and the compression ratio can be consequently controlled.

In this manner, a decoded image with required image quality can be obtained from only encoded data of the required data volume. When the quantization step A upon encoding is "1", and all bit planes are decoded upon decoding, the reproduced image matches an original image, i.e., reversible encoding and decoding can be realized.

Using the aforementioned function of limiting lower bit planes, since the code sequence to be decoded includes only bits corresponding to the designated region in larger quantity than other regions, as shown in FIGS. 6A to 6D, the same effect as that upon decoding image data which is obtained by encoding only the designated region at a low compression ratio and as a high-quality image can be consequently obtained.

In this embodiment, the expansion module 111 having the aforementioned decoder and the attribute discrimination module 114 expand image data compressed by the host computer 100, determine the ROI region indicated by information (mask information) appended thereto as a character region and a region indicated by other compressed image data as another region (e.g., image region), and store such information as intermediate data.

Note that the ROI and other regions may be discriminated based on the encoded data stream itself in place of the mask information, as described above.

Figure 15A:
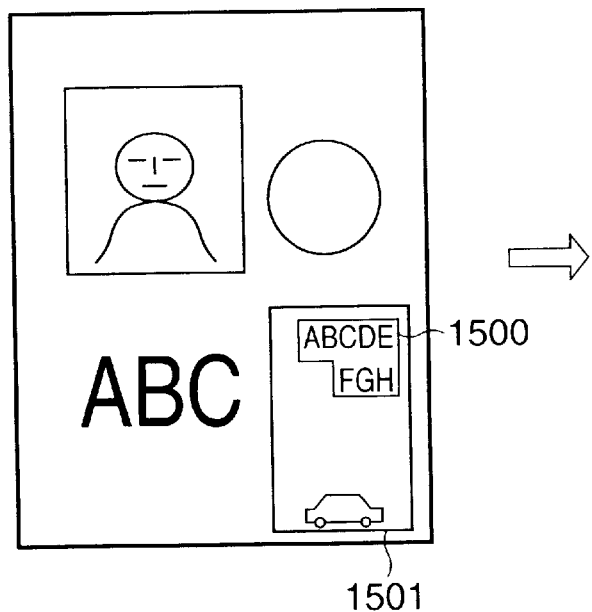
FIGS. 15A and 15B show a print image and its intermediate data, and the rendering results of bitmaps 1 and 2.

Therefore, the compressed image data is segmented into two regions in correspondence with the ROI, and attribute information is assigned to each region. For example, as shown in FIG. 15A, a lower right rectangle 1501 is compressed by the aforementioned method, and when a character region (ROI) 1500 indicating "ABCDEFGH" is present, an attribute is assigned, as shown in FIG. 15B.

Figure 15B:
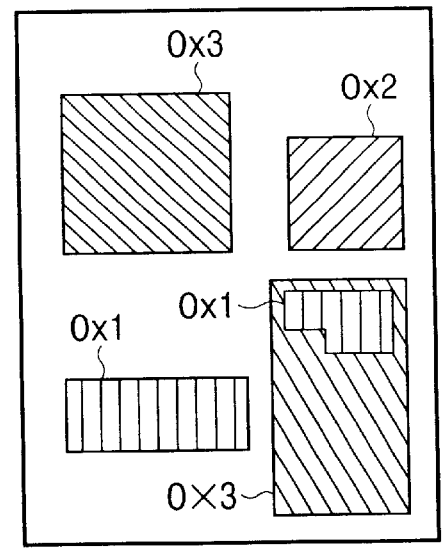

That is, in FIG. 15B, since the rectangular region 1501 is an image region, its attribute is "0×3" indicating the image region, and the attribute of the ROI region is set to be "0×1" indicating characters.

In attribute discrimination in step S6, the type of quality process of each object (e.g., a high-quality object, an object that may suffer certain quality drop, and the like) may be discriminated. Also, the type of required image process (e.g., a high-resolution object, multi-grayscale object, and the like) may be discriminated.

Furthermore, in step S6 the ROI region used in expansion in step S4 by the expansion module 111 may be determined as an attribute region, and the type of attribute may be determined based on an image quality designation parameter for that region.

In attribute discrimination in step S6, the ROI region used in expansion in step S4 by the expansion module 111 may be determined as an attribute region, and the type of attribute may be determined based on an image quality designation parameter for that region. In this case, pixels designated with a high compression ratio may be determined as a character region, and those designated with a low compression ratio may be determined as other regions.

In attribute discrimination in step S6, the ROI region used in expansion in step S4 by the expansion module 111 may be determined as an attribute region, and the type of attribute may be determined based on an image quality designation parameter for that region. In this case, pixels designated with a high compression ratio may be determined as a high-quality region, and those designated with a low compression ratio may be determined as a region that allows quality drop.

In attribute discrimination in step S6, the ROI region used in expansion in step S4 by the expansion module 111 may be determined as an attribute region, and the type of attribute may be determined based on an image quality designation parameter for that region. In this case, pixels designated with a high compression ratio may be determined as a resolution priority region, and those designated with a low compression ratio may be determined as a grayscale priority region.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:
input means for inputting compressed data, the compressed data including a data stream obtained by computing a wavelet transform of an image to obtain transform coefficients, shifting up bits of transform coefficients corresponding to a region of interest of the image, and entropy-encoding the shifted-up bits and bits of transform coefficients corresponding to a remaining region;
generation means for generating first bitmap data by expanding the compressed data;
interpretation means for interpreting the compressed data to discriminate a portion of the region of interest and a remaining portion in the first bitmap data; and
conversion means for executing image processes of the portion of the region of interest and the remaining portion using different parameters on the basis of a discrimination result of said interpretation means to convert the portions into second bitmap data.

2. The apparatus according to claim 1, wherein the compressed data includes mask information for discriminating the region of interest and the remaining region of the image, and said interpretation means discriminates the respective regions on the basis of the mask information.

3. The apparatus according to claim 1, wherein the data stream is obtained by computing a wavelet transform of an image to obtain transform coefficients, shifting up bits of transform coefficients corresponding to the region of interest of the image, filling bits "0" in blanks formed by the shift-up process, and entropy-encoding the shifted-up bits, bits of transform coefficients corresponding to a remaining region, and bits "0",
wherein said interpretation means discriminates the portion of the region of interest and the remaining portion in the first bitmap data by detecting the presence of bits "0" in the data stream.

4. The apparatus according to claim 1, wherein conversion by said conversion means is color conversion.

5. The apparatus according to claim 1, wherein conversion by said conversion means is half-toning processing.

6. An image processing method comprising the steps of:
inputting compressed data, the compressed data including a data stream obtained by computing a wavelet transform of an image to obtain transform coefficients, shifting up bits of transform coefficients corresponding to a region of interest of the image, and entropy-encoding the shifted-up bits and bits of transform coefficients corresponding to a remaining region;
generating first bitmap data by expanding the compressed data;
interpreting the compressed data to discriminate a portion of the region of interest and a remaining portion in the first bitmap data; and
executing image processes of the portion of the region of interest and the remaining portion using different parameters on the basis of a discrimination result in said interpreting step to convert the portions into second bitmap data.

7. A recording medium for storing a program implementing an image processing method, comprising:
an input module of inputting compressed data, the compressed data including a data stream obtained by computing a wavelet transform of an image to obtain transform coefficients, shifting up bits of transform coefficients corresponding to a region of interest of the image, and entropy-encoding the shifted-up bits and bits of transform coefficients corresponding to a remaining region;
a generation module of generating first bitmap data by expanding the compressed data;
an interpreting module of interpreting the compressed data to discriminate a portion of the region of interest and a remaining portion in the first bitmap data; and
an execution module of executing image processes of the portion of the region of interest and the remaining portion using different parameters on the basis of a discrimination result in said interpreting module to convert the portions into second bitmap data.

* * * * *

UNITED STATES PATENT AND TRADEMARK OFFICE
CERTIFICATE OF CORRECTION

| | |
|---|---|
| PATENT NO. | : 6,751,356 B2 |
| APPLICATION NO. | : 09/776917 |
| DATED | : June 15, 2004 |
| INVENTOR(S) | : Joji Oki |

It is certified that error appears in the above-identified patent and that said Letters Patent is hereby corrected as shown below:

COLUMN 2

Line 57, "2," should read --2;--.

COLUMN 5

Line 50, "attribute =character" should read --attribute=character--.

COLUMN 12

Line 21, "step A" should read --step Δ--.

Signed and Sealed this

Eighth Day of July, 2008

JON W. DUDAS
*Director of the United States Patent and Trademark Office*